United States Patent [19]

Okudaira

[11] 4,359,270
[45] Nov. 16, 1982

[54] ZOOM LENS

[75] Inventor: Sadao Okudaira, Ranzan, Japan

[73] Assignee: Asahi Kogaku Kogyo Kabushiki Kaisha, Tokyo, Japan

[21] Appl. No.: 242,738

[22] Filed: Mar. 11, 1981

[30] Foreign Application Priority Data

Mar. 24, 1980 [JP] Japan ................... 55/37288

[51] Int. Cl.³ .............................. G02B 15/16
[52] U.S. Cl. ................................. 350/427
[58] Field of Search ......................... 350/427

[56] References Cited

U.S. PATENT DOCUMENTS 4,105,291 8/1978 Tsuji ..................... 350/427
4,303,312 12/1981 Basista ................. 350/427

FOREIGN PATENT DOCUMENTS 2804667 8/1978 Fed. Rep. of Germany ...... 350/427
55-121418 9/1980 Japan ......................... 350/427

Primary Examiner—John K. Corbin
Assistant Examiner—Scott J. Sugarman
Attorney, Agent, or Firm—Sughrue, Mion, Zinn, Macpeak & Seas

[57] ABSTRACT

A high performance zoom lens including, in order from the object side, a convergent first lens group including a cemented lens composed of a negative meniscus lens having a surface of greater curvature on the image side and a first positive meniscus lens having a surface of greater curvature on the object side and a second positive meniscus lens having a surface of greater curvature on the object side, a divergent second lens group including a negative meniscus lens having a surface of greater curvature on the image side, a biconcave lens and a positive meniscus lens having a surface of greater curvature on the object side, a convergent third lens group including a biconvex lens and a convergent fourth lens group including a cemented lens composed of a biconvex lens and a biconcave lens, a cemented lens composed of a negative meniscus lens having a surface of greater curvature on the image side and a biconvex lens, and a negative meniscus lens having a surface of greater curvature on the object side. Each of the lens groups is independently mechanically mounted so as to be movable for zooming.

2 Claims, 8 Drawing Figures

ZOOM LENS

BACKGROUND OF THE INVENTION

Zoom lenses for 35 mm SLR (single lens reflex) cameras have heretofore reached a relatively high state of development. However, there have been few zoom lenses which have a wide range from the wide angle position to the telephoto position and are compact and have a high performance through the entire range of the lens.

An object of the present invention is to provide a zoom lens covering wide angle, 36 mm, and telephoto (132 mm) ranges for use with a 35 mm SLR camera and which is compact and has a high performance.

SUMMARY OF THE INVENTION

According to the invention a zoom lens with a high performance is provided which is composed, in order from the object side, of a convergent first lens group including a cemented lens composed of a negative meniscus lens having a surface of greater curvature on the image side and a positive meniscus lens having a surface of greater curvature on the object side and a positive meniscus lens having a surface of greater curvature on the object side, a divergent second lens group including a negative meniscus lens having a surface of greater curvature on the image side, a biconcave lens and a positive meniscus lens having a surface of greater curvature on the object side, a convergent third lens group including a biconvex lens, a convergent fourth lens group including a cemented lens composed of a biconvex lens and biconcave lens, a cemented lens composed of a negative meniscus lens having a surface of greater curvature on the image side and a biconvex lens, and a negative meniscus lens having a surface of greater curvature on the object side. In this zoom lens, each of the lens groups is independently mechanically movable to achieve the zooming operation. The zoom lens satisfies the following conditions (1) to (5):

$$l_{3s} > 1.5 l_{3M}, \quad (1)$$

$$3.3 f_s > f_1 > 2.7 f_s, \quad (2)$$

$$0.8 f_s > |f_2| > 0.75 f_s, f_2 < 0, \quad (3)$$

$$2.7 f_s > f_3 > 2.2 f_s, \quad (4)$$

$$2.2 f_s > f_4 > 1.8 f_s, \quad (5)$$

where: $f_s$ is the overall focal length at the wide angle end, that is, the wide angle setting or position of the zoom lens, $l_{3s}$ is the variable distance between the third and fourth lens groups at $f_s$, $l_{3M}$ is the distance between the third and fourth lens groups at $2.22 f_s$, $f_1$ is the focal length of the first lens group, $f_2$ is the focal length of the second lens group, $f_3$ is the focal length of the third lens group, and $f_4$ is the focal length of the fourth lens group.

DESCRIPTION OF THE PREFERRED EMBODIMENTS

Figure 1:
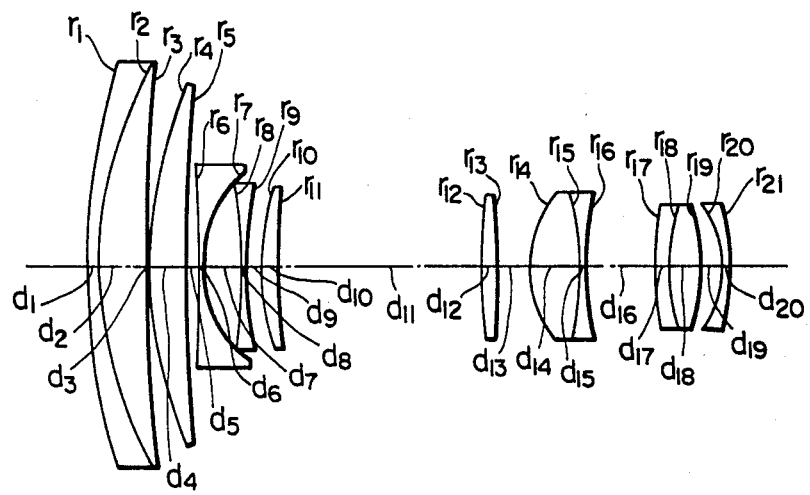
FIG. 1 is a cross-sectional view of a first embodiment of a zoom lens system according to the invention.
Figure 2:
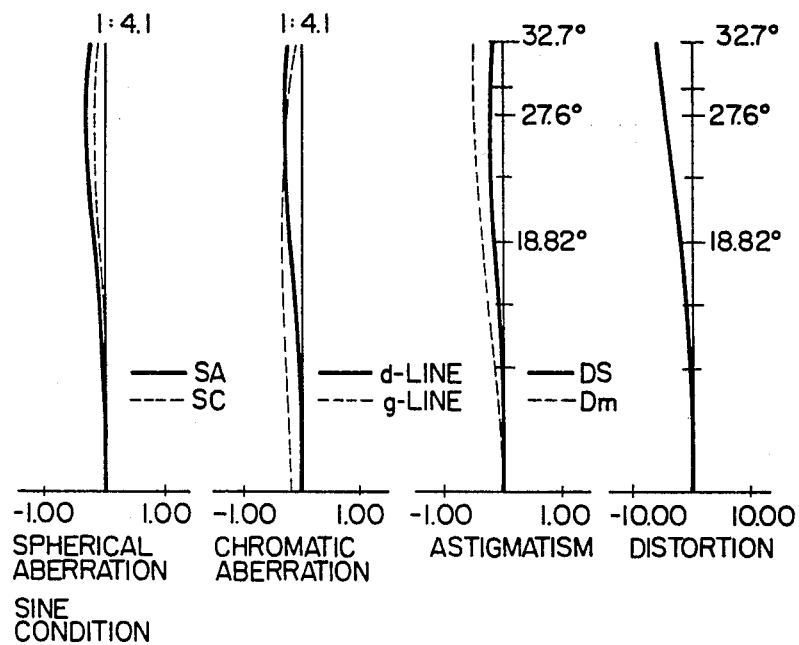
FIGS. 2, 3 and 4 are graphs showing various aberrations of the zoom lens of FIG. 1 at minimum, medium and maximum focal lengths, respectively.
Figure 3:
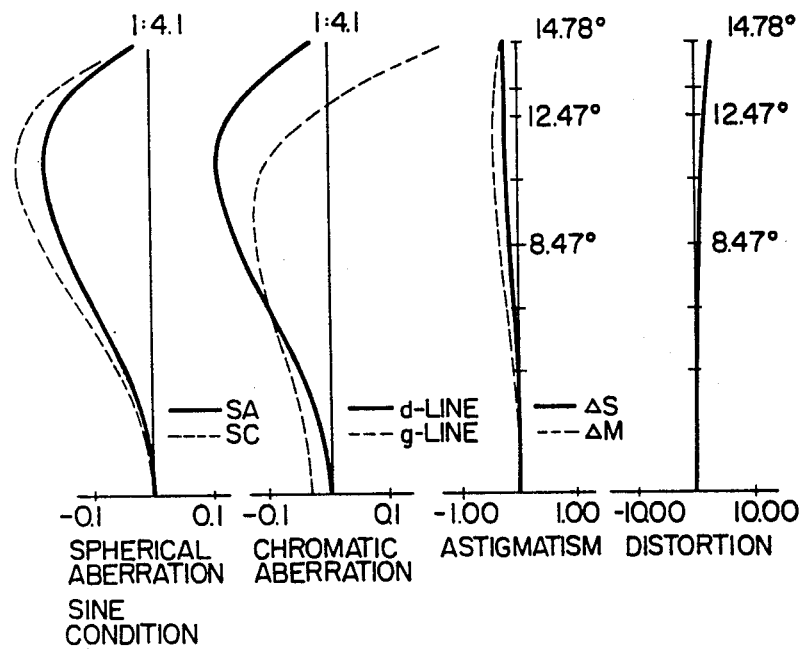
Figure 4:
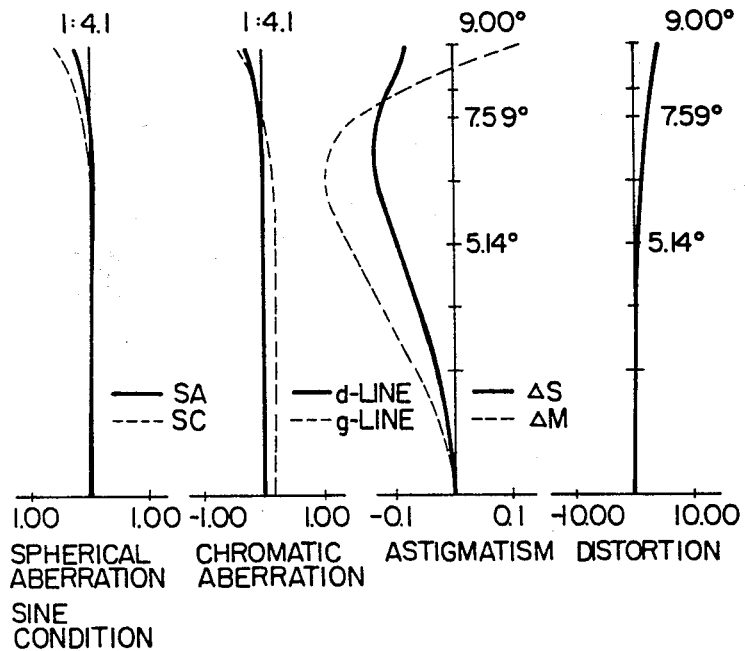
Figure 5:
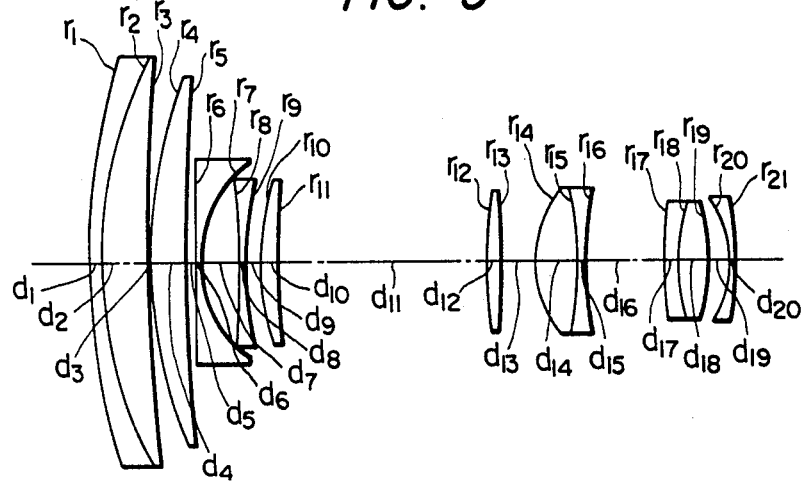
FIG. 5 is a cross-sectional view of a second embodiment of a zoom lens system according to the invention.
Figure 6:
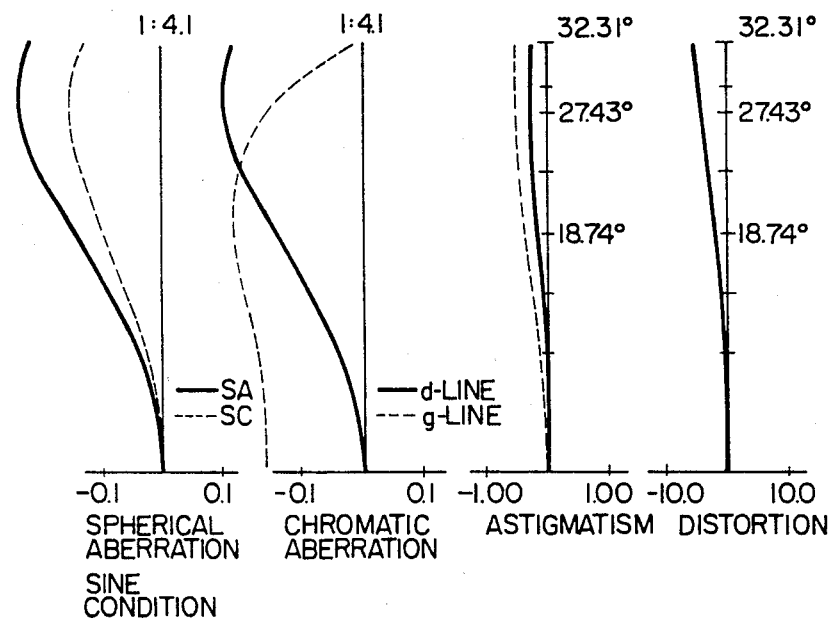
FIGS. 6, 7 and 8 are graphs showing various aberrations of the zoom lens of FIG. 5 at minimum, medium and maximum focal lengths, respectively.
Figure 7:
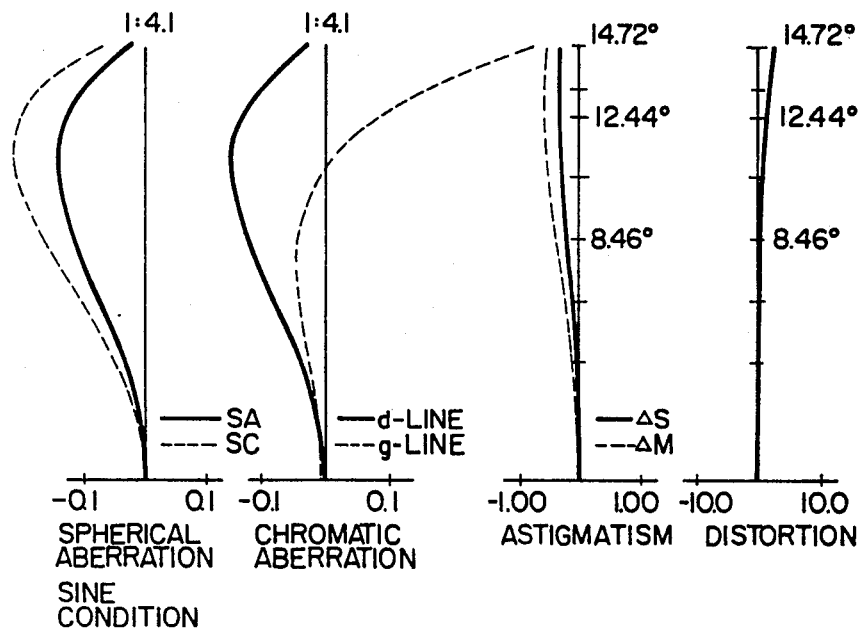
Figure 8:
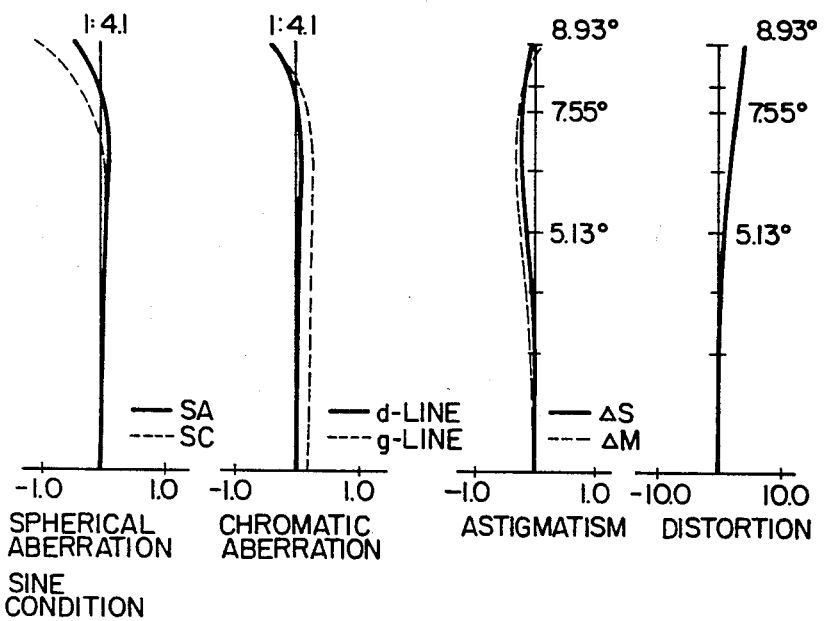

The conditions enumerated above will now be described.

The condition (1) is required to define a range of movement of the third lens group relative to the fourth lens group in order to obtain good spherical aberration compensation throughout the overall zoom range. This condition is important to attain high variability zoom as required by the present invention. That is, the variation of spherical aberration from the wide angle end to the telephoto end is reduced is a difficult problem to solve while maintaining a wide zoom range and compactness as required by the present invention. Inherently, the spherical aberration depends mainly on the third and fourth lens groups. Unless the third and fourth lens groups meet the condition (1), the variation of spherical aberration is increased from the wide angle end to the telephoto end. This leads to a poor performance.

The condition (2) is related to the focal length $f_1$ of the first lens group. When the focal length $f_1$ exceeds $3.3 f_s$, the amount of movement of the first lens group needed for focusing is increased so that the diameter of the front lens must be increased. Inversely, when the focal length is smaller than $2.7 f_s$, various aberrations become prominent and particularly, on the telephoto side, the chromatic aberration generated in the first lens group becomes large. It is very difficult to compensate for this aberration with the rear lens groups.

The condition (3) is related to the focal length $f_2$ of the second lens group which mainly serves as a variator in the zoom lens system. When $|f_2|$ is greater than $0.8 f_s$, in order to obtain the desired high zoom ratio, the movements of the divergent lens groups must be increased. As a result, the length of the zoom lens is increased. Inversely, when $|f_2|$ is smaller than $0.75 f_s$, it is difficult to compensate for astigmatism and coma aberration at the wide angle end.

The condition (4) concerns the focal length $f_3$ of the third lens group, co-acting with the condition (1). When the focal length $f_3$ is greater than $2.7 f_s$, in order to achieve compensation of spherical aberration at any focal length of the overall lens system, the movement of the third lens group relative to the fourth lens group is increased, which is undesirable for the lens support barrel or frame design. Inversely, when the focal length $f_3$ is smaller than $2.2 f_s$, although it is then possible to reduce the spherical aberration with a shorter movement of the third lens group, the variation of the axial chromatic aberration is remarkable.

The condition (5) relates to the focal length $f_4$ of the fourth lens group. When the focal length is greater than $2.2 f_s$, in order to cover the desired zoom range, the movement of the fourth lens group must be increased as a result of which the zoom lens is enlarged. Inversely, when the focal length $f_4$ is smaller than $1.8 f_s$, various aberrations, particularly, the absolute value of the spherical aberration on the telephoto side, are increased.

Specific Examples of zoom lenses constructed according to the present invention will now be described with reference to the following tables in which f is the overall focal length, $r_i$ is the radius of curvature of i-th lens surface, $d_i$ is the lens thickness or distance between adjacent lenses, $N_i$ is the refractive index of the i-th lens, and $v_i$ is the Abbe number of the i-th lens.

EXAMPLE 1

| | f = 35.97 ~ 132 | | F No. 1:4.1 | |
|---|---|---|---|---|
| | $r_i$ | $d_i$ | $N_i$ | $v_i$ |
| 1 | 115.000 | 1.80 | 1.84666 | 23.9 |
| 2 | 67.312 | 8.20 | 1.61800 | 63.4 |
| 3 | 388.000 | 0.10 | | |
| 4 | 75.596 | 6.22 | 1.67000 | 57.3 |
| 5 | 325.500 | $l_1$ | | |
| 6 | 1370.000 | 1.11 | 1.74100 | 52.7 |
| 7 | 20.382 | 6.16 | | |
| 8 | −108.316 | 1.00 | 1.64328 | 47.9 |
| 9 | 49.832 | 2.39 | | |
| 10 | 35.571 | 3.28 | 1.84666 | 23.9 |
| 11 | 126.000 | $l_2$ | | |
| 12 | 104.599 | 2.31 | 1.77250 | 49.6 |
| 13 | −225.000 | $l_3$ | | |
| 14 | 20.500 | 8.07 | 1.54072 | 47.2 |
| 15 | −45.300 | 1.21 | 1.80518 | 25.4 |
| 16 | 60.078 | 11.01 | | |
| 17 | 56.850 | 2.10 | 1.84666 | 23.9 |
| 18 | 25.920 | 5.63 | 1.66446 | 35.8 |
| 19 | −28.750 | 3.37 | | |
| 20 | −16.827 | 1.20 | 1.88300 | 40.8 |
| 21 | −39.006 | | | |

| overall focal length | 35.97 | 50.00 | 80.00 | 100.00 | 132.00 |
|---|---|---|---|---|---|
| $l_1$ | 1.47 | 14.79 | 28.04 | 33.34 | 45.64 |
| $l_2$ | 34.35 | 26.72 | 15.52 | 10.41 | 4.34 |
| $l_3$ | 5.80 | 3.35 | 1.08 | 0.39 | 1.59 |

$l_{3S} = 5.80 = 5.37 l_{3M}$
$f_1 = 109.39 = 3.04 f_s$
$|f_2| = 27.98 = 0.78 f_s$
$f_3 = 92.72 = 2.58 f_s$
$f_4 = 63.38 = 1.90 f_s$

EXAMPLE 2

| | f = 36.00 ~ 132 | | F No. 1:4.1 | |
|---|---|---|---|---|
| | $r_i$ | $d_i$ | $N_i$ | $v_i$ |
| 1 | 117.780 | 1.80 | 1.84666 | 23.9 |
| 2 | 68.597 | 8.24 | 1.61800 | 63.4 |
| 3 | 435.054 | 0.10 | | |
| 4 | 77.697 | 6.13 | 1.67000 | 57.3 |
| 5 | 344.587 | $l_1$ | | |
| 6 | 850.409 | 1.11 | 1.74100 | 52.7 |
| 7 | 20.382 | 6.23 | | |
| 8 | −106.775 | 1.00 | 1.64328 | 47.9 |
| 9 | 49.710 | 2.13 | | |
| 10 | 35.200 | 3.31 | 1.84666 | 23.9 |
| 11 | 127.275 | $l_2$ | | |
| 12 | 98.500 | 2.15 | 1.77250 | 49.6 |
| 13 | −208.360 | $l_3$ | | |
| 14 | 20.253 | 6.60 | 1.54072 | 47.2 |
| 15 | −46.218 | 1.21 | 1.80518 | 25.4 |
| 16 | 61.360 | 12.69 | | |
| 17 | 55.409 | 2.10 | 1.84666 | 23.9 |
| 18 | 25.647 | 5.55 | 1.66446 | 35.8 |
| 19 | −28.799 | 3.39 | | |
| 20 | −16.827 | 1.20 | 1.88300 | 40.8 |
| 21 | −43.089 | | | |

| overall focal length | 36.00 | 50.00 | 80.00 | 100.00 | 132.00 |
|---|---|---|---|---|---|
| $l_1$ | 1.38 | 13.43 | 26.99 | 35.77 | 47.01 |
| $l_2$ | 34.36 | 26.13 | 15.14 | 10.77 | 4.29 |
| $l_3$ | 5.97 | 2.89 | 0.53 | 0.46 | 1.19 |

$l_{3S} = 5.97 = 11.26 l_{3M}$
$f_1 = 110.227 = 3.06 f_s$
$|f_2| = 28.26 = 0.79 f_s$
$f_3 = 86.84 = 2.41 f_s$
$f_4 = 71.73 = 1.99 f_s$

What is claimed is:

1. A high performance zoom lens comprising, in order from the object side, a convergent first lens group including a cemented lens comprising a negative meniscus lens having a surface of greater curvature on the image side and a first positive meniscus lens having a surface of greater curvature on the object side and a second positive meniscus lens having a surface of greater curvature on the object side, a divergent second lens group including a negative meniscus lens having a surface of greater curvature on the image side, a biconcave lens and a positive meniscus lens having a surface of greater curvature on the object side, a convergent third lens group including a biconvex lens and a convergent fourth lens group including a cemented lens comprising a biconvex lens and biconcave lens, a cemented lens comprising a negative meniscus lens having a surface of greater curvature on the image side and a biconvex lens, and a negative meniscus lens having a surface of greater curvature on the object side, wherein each of said lens groups is independently mechanically movable for zooming, said zoom lens satisfying the following conditions:

| | f = 35.97 ~ 132 | | F No. 1: 4.1 | |
|---|---|---|---|---|
| | $r_i$ | $d_i$ | $N_i$ | $v_i$ |
| 1 | 115.000 | 1.80 | 1.84666 | 23.9 |
| 2 | 67.312 | 8.20 | 1.61800 | 63.4 |
| 3 | 388.000 | 0.10 | | |
| 4 | 75.596 | 6.22 | 1.67000 | 57.3 |
| 5 | 325.500 | $l_1$ | | |
| 6 | 1370.000 | 1.11 | 1.74100 | 52.7 |
| 7 | 20.382 | 6.16 | | |
| 8 | −108.316 | 1.00 | 1.64328 | 47.9 |
| 9 | 49.832 | 2.39 | | |
| 10 | 35.571 | 3.28 | 1.84666 | 23.9 |
| 11 | 126.000 | $l_2$ | | |
| 12 | 104.599 | 2.31 | 1.77250 | 49.6 |
| 13 | −225.000 | $l_3$ | | |
| 14 | 20.500 | 8.07 | 1.54072 | 47.2 |
| 15 | −45.300 | 1.21 | 1.80518 | 25.4 |
| 16 | 60.078 | 11.01 | | |
| 17 | 56.850 | 2.10 | 1.84666 | 23.9 |
| 18 | 25.920 | 5.63 | 1.66446 | 35.8 |
| 19 | −28.750 | 3.37 | | |
| 20 | −16.827 | 1.20 | 1.88300 | 40.8 |
| 21 | −39.006 | | | |

| overall focal length | 35.97 | 50.00 | 80.00 | 100.00 | 132.00 |
|---|---|---|---|---|---|
| $l_1$ | 1.47 | 14.79 | 28.04 | 33.34 | 45.64 |
| $l_2$ | 34.35 | 26.72 | 15.52 | 10.41 | 4.34 |
| $l_3$ | 5.80 | 3.35 | 1.08 | 0.39 | 1.59 |

$l_{3S} = 5.80 = 5.37 l_{3M}$
$f_1 = 109.39 = 3.04 f_s$
$|f_2| = 27.98 = 0.78 f_s$
$f_3 = 92.72 = 2.58 f_s$
$f_4 = 68.38 = 1.90 f_s$ where $r_i$ is the radius of curvature of the i-th lens surface, $d_i$ is the lens thickness or distance between adjacent lenses, $N_i$ is the refractive index of the i-th lens, $v_i$ is the Abbe number of the i-th lens, $f_s$ is the overall focal length of said zoom lens at a wide angle position thereof, $l_{3s}$ is the distance between said third and fourth lens groups at $f_s$, and $l_{3M}$ is the distance between said third and fourth lens groups at $2.22 f_s$.

2. A high performance zoom lens comprising, in order from the object side, a convergent first lens group including a cemented lens comprising a negative meniscus lens having a surface of greater curvature on the image side and a first positive meniscus lens having a surface of greater curvature on the object side and a second positive meniscus lens having a surface of greater curvature on the object side, a divergent second lens group including a negative meniscus lens having a surface of greater curvature on the image side, a biconcave lens and a positive meniscus lens having a surface of greater curvature on the object side, a convergent third lens group including a biconvex lens and a convergent fourth lens group including a cemented lens comprising a biconvex lens and biconcave lens, a cemented lens comprising a negative meniscus lens having a surface of greater curvature on the image side and a biconvex lens, and a negative meniscus lens having a surface of greater curvature on the object side, wherein each of said lens groups is independently mechanically movable for zooming, said zoom lens satisfying the following conditions:

| | f = 36.00 ~ 132 | | F No. 1:4.1 | |
|---|---|---|---|---|
| | $r_i$ | $d_i$ | $N_i$ | $\nu_i$ |
| 1 | 117.780 | 1.80 | 1.84666 | 23.9 |
| 2 | 68.597 | 8.24 | 1.61800 | 63.4 |
| 3 | 435.054 | 0.10 | | |
| 4 | 77.697 | 6.13 | 1.67000 | 57.3 |
| 5 | 344.587 | $l_1$ | | |
| 6 | 850.409 | 1.11 | 1.74100 | 52.7 |
| 7 | 20.382 | 6.23 | | |
| 8 | −106.775 | 1.00 | 1.64328 | 47.9 |
| 9 | 49.710 | 2.13 | | |
| 10 | 35.200 | 3.31 | 1.84666 | 23.9 |
| 11 | 127.275 | $l_2$ | | |
| 12 | 98.500 | 2.15 | 1.77250 | 49.6 |
| 13 | −208.360 | $l_3$ | | |
| 14 | 20.253 | 6.60 | 1.54072 | 47.2 |
| 15 | −46.218 | 1.21 | 1.80518 | 25.4 |
| 16 | 61.360 | 12.69 | | |
| 17 | 55.409 | 2.10 | 1.84666 | 23.9 |
| 18 | 25.647 | 5.55 | 1.66446 | 35.8 |
| 19 | −28.799 | 3.39 | | |
| 20 | −16.827 | 1.20 | 1.88300 | 40.8 |
| 21 | −43.089 | | | |

| overall focal length | 36.00 | 50.00 | 80.00 | 100.00 | 132.00 |
|---|---|---|---|---|---|
| $l_1$ | 1.38 | 13.43 | 26.99 | 35.77 | 47.01 |
| $l_2$ | 34.36 | 26.13 | 15.14 | 10.77 | 4.29 |
| $l_3$ | 5.97 | 2.89 | 0.53 | 0.46 | 1.19 |

$l_{3S} = 5.97 = 11.26 l_{3M}$
$f_1 = 110.227 = 3.06 f_s$
$|f_2| = 28.26 = 0.79 f_s$
$f_3 = 86.84 = 2.41 f_s$
$f_4 = 71.73 = 1.99 f_s$ where $r_i$ is the radius of curvature of the i-th lens surface, $d_i$ is the lens thickness or distance between adjacent lenses, $N_i$ is the refractive index of the i-th lens, i is the Abbe number of the i-th lens, $f_s$ is the overall focal length of said zoom lens at a wide angle position thereof, $l_{3S}$ is the distance between said third and fourth lens groups at $f_s$, and $l_{3M}$ is the distance between said third and fourth lens groups at $2.22 f_s$.

* * * * *